United States Patent
Lin et al.

(10) Patent No.: US 7,408,304 B1
(45) Date of Patent: Aug. 5, 2008

(54) APPARATUS FOR POWER CIRCUIT OF LIGHT EMITTING DIODE

(75) Inventors: Ray-Ming Lin, Tao-Yuan (TW); Sheng-Fu Yu, Tao-Yuan (TW); Wei-Tse Weng, Tao-Yuan (TW); Yung-Hsiang Lin, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 0 days.

(21) Appl. No.: 11/727,433

(22) Filed: Mar. 27, 2007

(51) Int. Cl.
*G09G 3/10* (2006.01)

(52) U.S. Cl. ............. 315/169.1; 315/169.3; 315/185 R; 315/192; 315/318; 362/239; 362/545; 362/800

(58) Field of Classification Search ............. 315/169.1, 315/169.3, 185 R, 185 S, 312, 318, 192; 362/239, 543, 545, 800, 806; 340/815.45
See application file for complete search history.

(56) References Cited

U.S. PATENT DOCUMENTS

| | | | | |
|---|---|---|---|---|
| 5,457,450 A | * | 10/1995 | Deese et al. | 340/912 |
| 6,814,459 B2 | * | 11/2004 | Pederson | 362/35 |
| 6,864,641 B2 | * | 3/2005 | Dygert | 315/216 |
| 7,081,722 B1 | * | 7/2006 | Huynh et al. | 315/323 |
| 7,138,770 B2 | * | 11/2006 | Uang et al. | 315/291 |

* cited by examiner

*Primary Examiner*—Haissa Philogene
(74) *Attorney, Agent, or Firm*—Bacon & Thomas, PLLC

(57) ABSTRACT

The invention is set for connecting L.E.D., bridging rectifier and AC/DC power transformer by using series connection method, also the main purpose is for saving energy and reducing the cost of electronic components. The first apparatus is built by first bridge rectifier, first L.E.D. group and first current-limiting resistor using the series connection method. The second apparatus is built by second bridge rectifier, second L.E.D. group and second current-limiting resistor using the series connection method. Then, finally the previous two apparatus will be connected each other by using parallel connection method to the AC/DC power source.

4 Claims, 1 Drawing Sheet

APPARATUS FOR POWER CIRCUIT OF LIGHT EMITTING DIODE

BACKGROUND OF THE INVENTION

1. Field of the Invention

The invention relates to an electrical circuit apparatus for L.E.D., more particularly for applying to an alternating current (A.C.) power circuit apparatus for L.E.D.

2. Description of the Prior Art

At the present day, light emitting (L.E.D.) device is a revolution-effect production after the electronic transistor and the laser L.E.D. appeared by the semiconductor technology development. The lifetime of L.E.D. light bulb can be longer than the normal light bulb about 50 to 100 folds. Also, the power consumption of L.E.D. is about ⅓ to ⅕ than the normal light bulb. Therefore, in the $21^{st}$ century, it is possible to become a new lighting source coupled with electricity saving and green concept, to be taken over the tungsten-filament lamp and the mercury lamp.

The related peripheral technology for the L.E.D. including the lighting source research and development technology for the L.E.D., driving force tech of the power source for the L.E.D., and modulus design technology for L.E.D., all the previous technology should be still researched and developed for coordinating the brand new L.E.D technology development.

The power source supply for driving the L.E.D. right now is operated and supported by the outside connection power source adaptor. Generally, the outside 110 voltage alternating current (AC) can be transferred to the direct current (D.C.), then, the previous direct current (D.C.) can be provided as the L.E.D. power source. Therefore, the power energy consumer will be much more between alternating current and direct current transferring. Also, the outside power source adaptor is needed for driving the L.E.D.

When there are a plurality of L.E.D. existed, there is a plurality of power source adaptors needed for supporting power source. It will cause all circuit structures to become more complex, and the use rate of driving circuit will be lower. Also, due to the number of connections for driving circuit, connection components and different sorts of terminal will be highly increased. It will make the occupation of whole circuit to be bigger, to increase the difficulty for the production technology; also the manufacture cost will be higher.

Therefore, how to avoid the power energy consumer between alternating current and direct current transferring, also, to reduce the number of the L.E.D. circuit components and different sorts of connection lines, to reduce entire production cost, to decrease production technology steps and the internal components occupation for the L.E.D., thus, it will be the important and urgent issue to be solved in the semiconductor fields.

In addition, although the American U.S. Pat. No. 6,864,641, "Method and apparatus for controlling light emitting diodes" points out the advance control method and apparatus for the L.E.D., yet there is no more about the alternating power source circuit related technology in this patent. The American U.S. Pat. No. 6,814,459, "LED light bar" teaches providing power supply by the battery but no more about the alternating power source circuit related technology.

Furthermore, in Taiwan patent No. M242, 932, "L.E.D. circuit apparatus" is only one issue for forming a stable electrical voltage circuit apparatus. Another Taiwan patent No. I259, 029, "L.E.D. driving circuit" is for controlling a plurality of L.E.D. lightening condition. However, the above two patents both are still not related this invention technology.

SUMMARY OF THE INVENTION

In accordance with the present invention, an apparatus is provided for power circuit of light emitting diode.

The foregoing, as well as additional objects, features and advantages of the invention will be more readily apparent from the following detailed description, which proceeds with reference to the accompanying drawings.

The invention can reduce the amount of the electrical source adaptors; can also reduce complexity for the electrical circuit structure. Furthermore, the number of driving circuit connection lines, connection components, and different sorts of terminals all can be highly reduced. It makes the occupation for the whole electrical circuits to be much smaller, to reduce the difficulty for the product technology, also to reduce the production cost.

The invention, apparatus for power circuit of light emitting diode can be described as the followings:

The first L.E.D. group will be connected by the series connection method with the first full-wave bridge rectifier, the first L.E.D. group and the first current-limiting resistor.

The second L.E.D. group will be connected by the series connection method with the second full-wave bridge rectifier, the second L.E.D. group and the second current-limiting resistor.

Wherein the above-mentioned every L.E.D. group using a plurality of L.E.D. bulbs is connected by the series connection method. Sequentially, the previous two L.E.D. group can be connected to each other by the parallel connection method, then can be connected with a alternating current power source supply as the L.E.D. power circuit apparatus.

Therefore, the invention can avoid the electrical energy consume for changing from the direct current to the alternating current, also can reduce request for the amounts of circuit elements and various connection elements, so that it can reduce the occupation for the whole electrical circuits much more smaller, reducing the difficulty for the product technology, also for reducing the production cost.

BRIEF DESCRIPTION OF THE DRAWINGS

The foregoing aspects and many of the attendant advantages of this invention will become more readily appreciated as well becomes better understood by reference to the following detailed description, when taken in conjunction with the accompanying drawings, wherein.

DESCRIPTION OF THE PREFERRED EMBODIMENT

Figure 1:
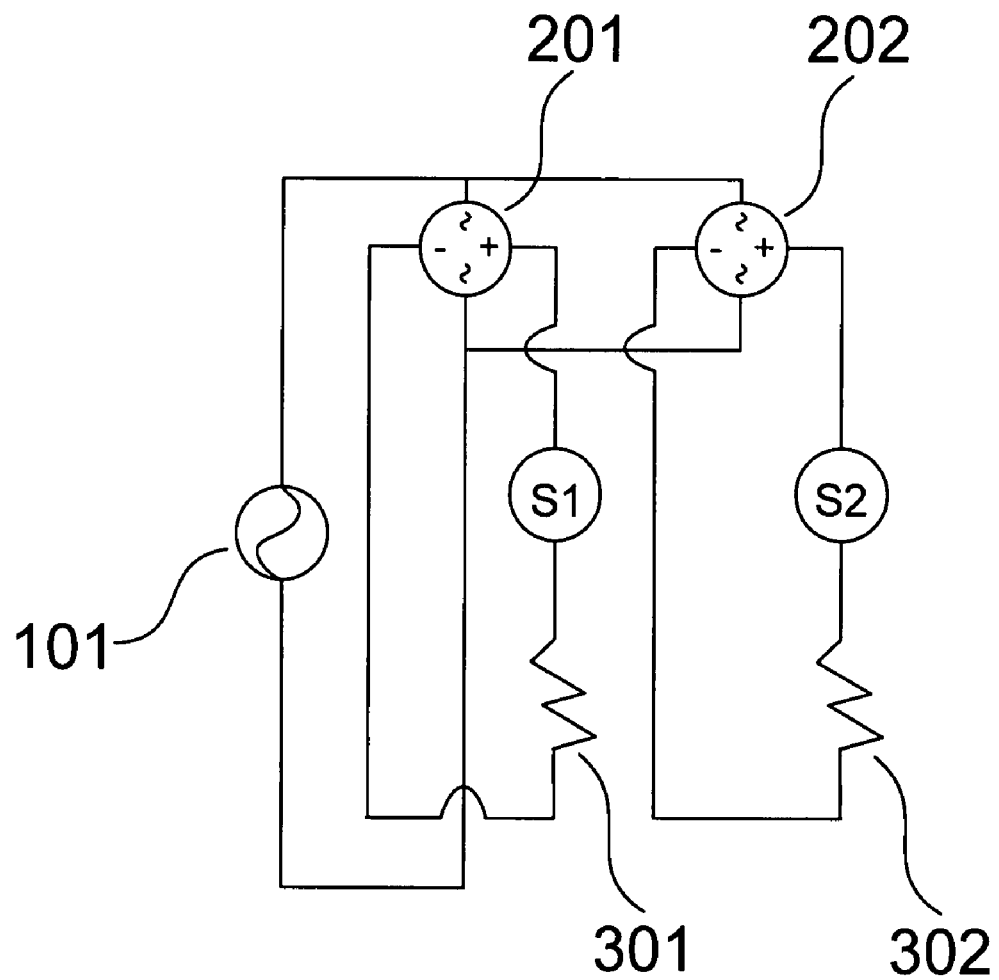
FIG. 1 is schematically illustrating the embodiment of the invention.

The following is a description of the present invention. The invention firstly will be described with reference to one exemplary structure. Some variations will then be described as well as advantages of the present invention. A preferred method of fabrication will then be discussed. An alternate, asymmetric embodiment will then be described along with the variations in the process flow to fabricate this embodiment.

Due to inconvenience caused by the conventional technology, the main purpose for this invention is to avoid the use of the power adaptor and reducing the element cost by using the series connection method for the whole L.E.D. apparatus. The invention will be described as the followings:

As FIG. 1 shows, the first L.E.D. composition unit apparatus can be connected with the full-wave bridge rectifier 201, the S1 L.E.D. group, as well as the current-limiting resistor 301 using the series connection method.

Further, as FIG. 1 shows, the second L.E.D. composition unit apparatus can be connected with the full-wave bridge rectifier 202, the S2 L.E.D. group, as well as the current-limiting resistor 302 using the series connection method.

Finally, still such as FIG. 1, the previous two L.E.D. composition unit apparatus can be connected to each other using the parallel connection method, and then can be together connected to the alternating current (AC) power source supply 101, becoming as the L.E.D. power circuit apparatus.

In the invention, the previous S1 L.E.D. group and S2 L.E.D. group both are connected using a plurality of L.E.D. bulbs by the series connection method.

Wherein, the goal of the full-wave bridge rectifier is for regulating the transformation between the alternating current to the direct current, the goal of the current-limiting resistor is for adjusting the voltage and the electric current proportion, also for limiting the excess current.

The invention could connect the further multiple L.E.D. composition unit apparatus, i.e. expanding the more L.E.D. composition unit apparatus amounts, could be effect use for increasing brightness.

The main consideration of this invention is that the whole brightness situation could be under the very close situation, in the first L.E.D. composition unit apparatus, there are about 48 L.E.D. bulbs connected as the S1 L.E.D. group using the series connection method, and connected 2000 ohms current-limiting resistor.

In the second L.E.D. composition unit apparatus, there are about 49 L.E.D. bulbs connected as the S2 L.E.D. group using the series connection method, and connected 2000 ohms current-limiting resistor.

After two L.E.D. composition unit apparatus can be connected to each other using the parallel connection method, and then together connected to the alternating current (AC) source supply 101, becoming as the L.E.D. power circuit apparatus.

After examining the real value of operation result for this invention, also comparing with the calculated theory value of the operation result, the real value of operation result are quite different with the calculated theory value of operation result. The reason, mainly due to the voltages values for every L.E.D. bulb would be not close, so that the difference appeared between the real value of operation result and the calculated theory value of the operation result when series connection method is used.

By the power circuit apparatus of L.E.D. for this invention, when the 20 mA conducting current can be obtained, the 50 L.E.D. bulbs can be selected and connected as the L.E.D. group by the series connection method, then, series connecting the current-limiting current between 1500 ohms to 2000 ohms as the power circuit apparatus.

The power circuit apparatus of the invention can be built by connecting each other two L.E.D. groups using the parallel connection method; it can make lightness of L.E.D. and promote brightness of L.E.D. much higher than before. Also, the present invention would not glitter again due to having the full-wave bridge rectifier.

After allocating the amount number for the L.E.D. bulbs and the current-limiting resistor, the power circuit apparatus can be kept brightness stable. The reason, mainly due to the voltages values for every L.E.D. bulb even would be just very small difference, though the total difference will be obviously appeared, when a plurality of L.E.D. bulbs can be connected by the series connection method.

Usually, the current-limiting resistor will be necessary for the L.E.D. bulb in order to limit the over-current. Therefore, firstly, the necessary series resistors can be obtained by the theory calculation. However, normally the alternating current power source is 110 volts, so that the actual peak value should be as $110 \times \sqrt{2} \approx 155.5$ volts (V). Therefore, the discussion under three kinds of forward current situations, the current-limiting resistor value will be the followings:

1. When conducting 20 mA, the switching voltage for the yellow light L.E.D. bulb forward voltage will be 2.1 volts (V). If 50 L.E.D. bulbs are connected, the total span voltage for the L.E.D. bulbs will approximately be 105 volts (V), therefore the voltage reducing for the current-limiting resistor will be consumed as 155.5−105=50.5 volts (V), the limiting resistor will be 50.5 volts (V)/20 mA, therefore it is equal to 2,500 ohms.
2. When conducting 30 mA, the switching voltage for the yellow light L.E.D. bulb will be 2.17 volts (V). If 50 L.E.D. bulbs are connected, the total span voltage for the L.E.D. bulbs will approximately be 108.5 volts (V), therefore the voltage reducing for the current-limiting resistor will be consumed as 155.5−108.5=47 volts (V), the limiting resistor will be 47 volts (V)/30 mA, therefore it is equal to 1,570 ohms.
3. When conducting 40 mA, the switching voltage for the yellow light L.E.D. will be 2.24 volts (V). If 50 L.E.D. bulbs are connected, the total span voltage for the L.E.D. bulbs will approximately be 112 volts (V), therefore the voltage reducing for the current-limiting resistor will be consumed as 155.5−112=43.5 volts (V), the limiting resistor will be 43.5 volts (V)/40 mA, therefore it is equal to 1,080 ohms.

From the above results, when the 50 yellow-light L.E.D. bulbs are all connected by the series connection method, the switching current would be from 20 mA to 40 mA, the resistor between 1.08 thousand ohms($\Omega$) to 2.5 thousand ohms($\Omega$) can be selected as the current-limiting current.

It is understood that various other modifications will be apparent to and can be readily made by those skills in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skills in the art to which this invention pertains.

What is claimed is:

1. An apparatus for alternating current power circuit of light emitting diode, comprising:
    a first light emitting diode composition unit apparatus having a first full-wave bridge rectifier apparatus regulating a transformation from alternating current to direct current, a first light emitting diode group and a first current-limiting resistor connected to each other using a series connection method;
    a second light emitting diode composition unit apparatus having a second full-wave bridge rectifier apparatus regulating a transformation from alternating current to direct current, a second light emitting diode group and a second current-limiting resistor connected to each other using a series connection method;
    an alternating current power source apparatus providing alternating current; and
    said first light emitting diode composition unit apparatus connecting each other with said second light emitting diode composition unit apparatus using a parallel connection method, and being connected to the alternating power source apparatus by said series connection method for forming the apparatus for power circuit of light emitting diode.

2. The apparatus according to claim 1, wherein said plurality of light emitting diode groups comprises a plurality of light emitting diode bulbs using the series connection method.

3. The apparatus according to claim 1, wherein said current-limiting resistor is for adjusting the voltage and the electric current proportion in order to limit the excess current.

4. The apparatus according to claim 1, wherein said apparatus for power circuit of light emitting diode further comprises a plurality of light emitting diode composition unit apparatus.

* * * * *